Jan. 16, 1962 T. W. TOWNS 3,016,990
SELF-ADJUSTING BRAKE
Filed July 22, 1959 2 Sheets-Sheet 2
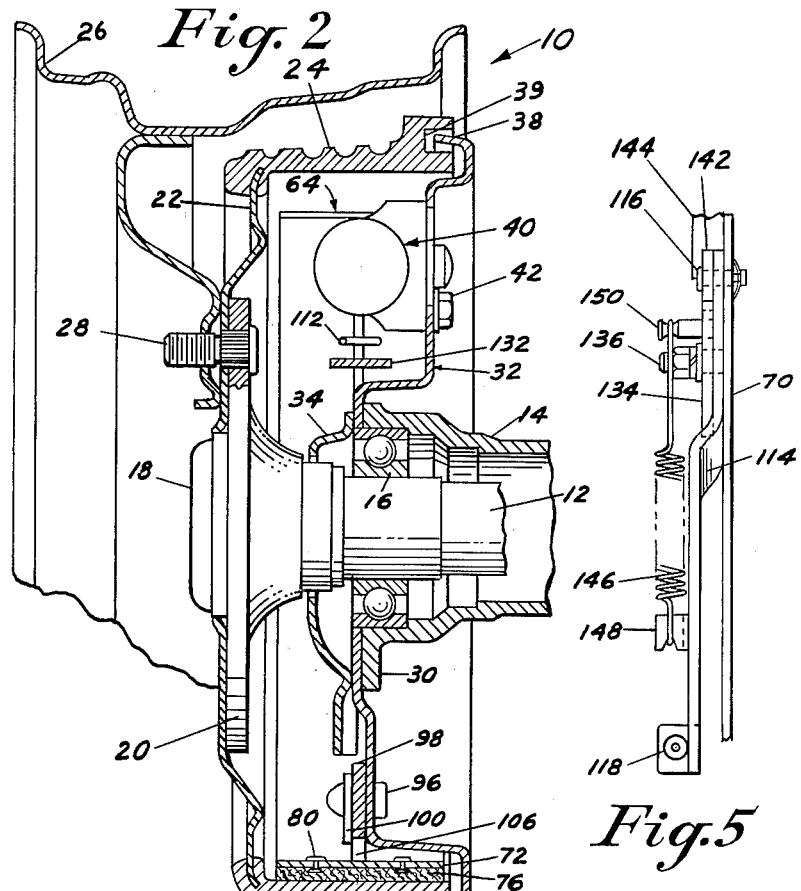
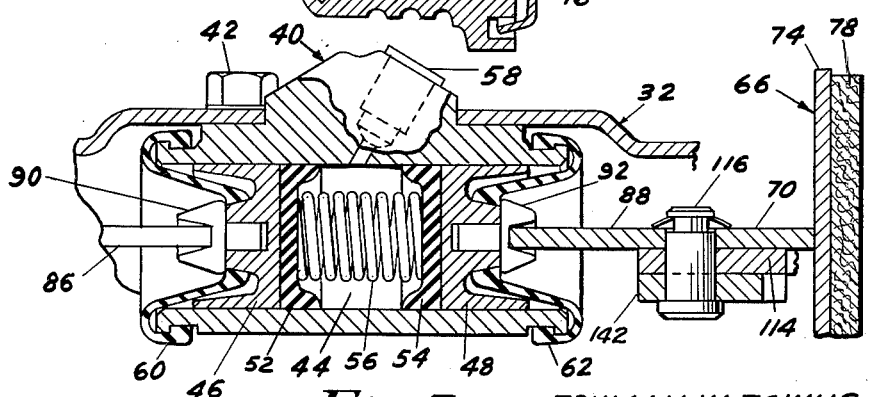
TRUMAN W. TOWNS
INVENTOR.
BY John R. Faulkner
Clifford L. Sadler
ATTORNEYS

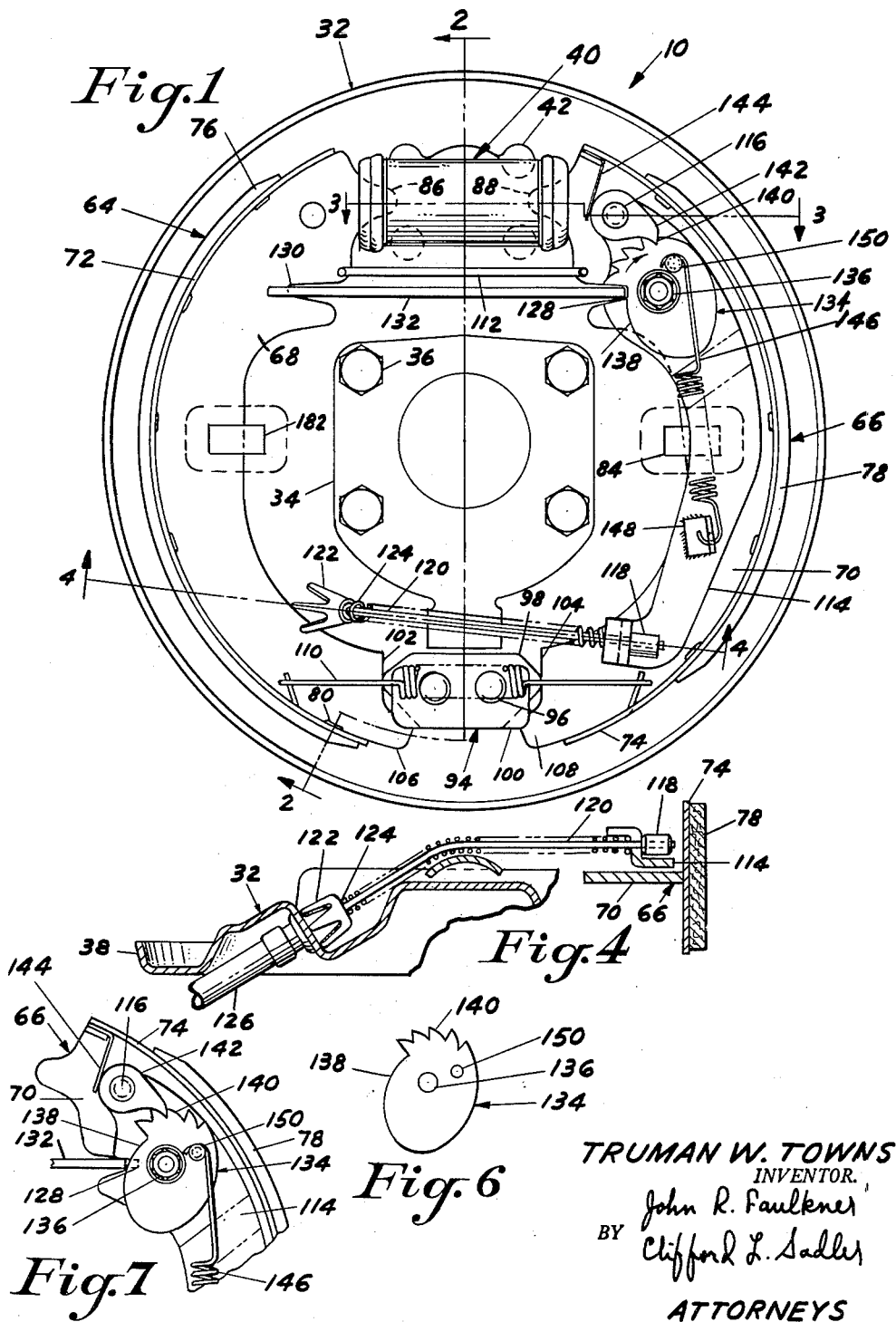

United States Patent Office 3,016,990
Patented Jan. 16, 1962

3,016,990
SELF-ADJUSTING BRAKE
Truman W. Towns, St. Clair Shores, Mich., assignor to Ford Motor Company, Dearborn, Mich., a corporation of Delaware
Filed July 22, 1959, Ser. No. 828,829
3 Claims. (Cl. 188—79.5)

The present invention relates to brake systems and more particularly to automatic means for adjusting expanding internal shoe brakes for vehicles.

In vehicle brake systems where two or more rigid brake shoes are expanded against an internal drum to achieve a braking action, application of the brakes will result in a wearing of the friction surface which contacts the brake drum. As the friction surface or brake lining wears, an ever increasing gap will be created between the drum and the brake lining when the brake shoe is held in an inactive or retracted position. If the brake shoes are actuated by a conventional brake pedal within the vehicle, then greater and ever increasing pedal travel will be required merely to bring the shoe into contact with the drum let alone move the shoe against the drum with sufficient force to retard the forward progress of the vehicle.

Therefore, means are usually provided to increase the separation of the worn brake shoes at periodic intervals whenever pedal travel is of such a magnitude as to indicate that an adjustment is in order. One well-known means takes the form of an expandable device between the shoe ends which has a threaded engagement between members of the device so that relative rotational movement will increase its length. In order to effect a brake adjustment, it is necessary to raise the entire vehicle or use some other means so that access may be had to the brake. A pliable dust cover is removed from an access opening in the brake backing plate and a tool such as a screwdriver is inserted through the hole for purposes of rotating one member of the adjustable assembly.

This manual effort is of considerable inconvenience; however, until it is performed the brakes will not function entirely satisfactorily.

In view of the foregoing state of the art, it is an object of the present invention to provide automatic means for maintaining a desired clearance between the brake shoes and brake drum when the shoes are in a retracted position.

It is a further object of the present invention to provide means for automatically adjusting the shoe to drum clearance of a vehicle brake so that the distance between the brake lining and brake drum will never be greater than a preselected maximum dimension.

These and further objects of the present invention will become apparent from the following description and the accompanying drawings in which:

FIGURE 1 is an elevational view of a vehicle brake containing the preferred embodiment of the present invention;

FIGURE 2 is a sectional view taken along section lines 2—2 of FIGURE 1;

FIGURE 3 is a sectional view taken along section lines 3—3 of FIGURE 1;

FIGURE 4 is a sectional view taken along section lines 4—4 of FIGURE 1;

FIGURE 5 is an end view of the automatic brake adjusting means portion of FIGURE 1;

FIGURE 6 is an elevational view of the cam element of the automatic adjusting means; and FIGURE 7 is an elevational view of the adjusting means after two automatic adjustments.

Referring now to the drawings for a detailed description of the present invention wherein like reference numerals identify like parts, FIGURE 1 discloses a vehicle wheel brake 10 of the expandable internal shoe type.

In FIGURE 2, a vehicle wheel axle 12 contained within a coaxial housing 14 is supported for rotation by an anti-friction bearing 16. The outer end of the axle 14 is provided with a hub 18 and an integral radial flange 20. Concentric with the hub 18 is a brake drum supporting disc 22. Disc 22 is cold-pressed from sheet steel and has a cylindrical cast iron brake drum 24 attached to its periphery. A vehicle wheel 26 is provided concentric about the hub 18 for carrying a road tire. Disc 22 and wheel 26 are secured to the flange 20 by means of a series of bolts 28.

The outer end of the axle housing 14 terminates in a flanged portion 30 which provides a surface to which a brake backing plate 32 may be bolted. A retaining plate 34 having an opening for the hub of the axle 18 is secured over the end of the axle housing 14 to the flange 30 along with the backing plate 32 by means of bolts 36.

The backing plate 32 is of an irregular dish-shaped configuration and has a peripheral lip 38 which fits within a slot 39 in the drum 24. The combination of lip 38 and annular slot 39 tends to prevent the passage of dust and other contaminants into the interior of the brake; the interior being defined by the backing plate 32, drum 24 and disc 22.

The brake backing plate 32 is secured to a nonrotating member (the axle housing 14) and provides a support or reaction member for the brake shoes and brake shoe actuating mechanism. Referring to FIGURE 3, a hydraulic wheel cylinder 40 is secured to the backing plate 32 by cap screws 42. Wheel cylinder 40 has a cylindrical bore 44 and a pair of left and right metallic pistons 46 and 48 slidably contained therein. A pair of pliable cups 52 and 54 are provided in the bore 44 in association with the pistons 46, 48 at their inboard sides to function as seals. A spring 56 lightly presses the pistons 46, 48 and cups 52, 54 to a separated position. Communicating within the interior of the bore 44 between the cups 52 and 54 is a fitting 58 for the reception of a hydraulic pressure fluid. The application of pressure fluid to the interior space of the bore 44 between the cups 52, 54 will force the pistons 46 and 48 to separate and actuate the brake as will be described. A pair of caps 60, 62 are provided over the open ends of the bore 44 to seal against the entry of dust into the bore 44.

Positioned within the brake drum 24 and movably secured to the backing plate 32 is a pair of primary and secondary brake shoes 64 and 66 respectively. The outer surface of each of the shoes 64, 66 is formed to a segment of a cylinder and complements the internal surface of the cylindrical brake drum 24. The shoes 66, 64 have a generally T-shaped cross section with web portions 68 and 70 and segmental cylindrical portions 72, 74 for the support of frictional brake lining material 76, 78. The linings 76, 78 are attached to portions 72, 74 by appropriate means such as rivets 80. The shoes 64, 66 are positioned on the backing plate 32 by means of clips 82, 84 which have tangs that are stamped out of the plane of the backing plate 32 and fit over the webs 68, 70. The upper ends of the shoes 64, 66 are provided with protrusions 86, 88 which extend circumferentially from the webs 68, 70. The protrusions 86, 88 engage bearing members 90, 92 which, in turn, fit into slots formed in the outer ends of the pistons 46, 48 of the wheel cylinder 44.

The lower end of the primary and secondary shoes 64, 66 engage an anchor assembly 94 which is secured to the backing plate by means of rivets 96. Anchor assembly 94 includes a stop plate 98 and a retainer member 100. In FIGURE 1 wherein the shape of the members 98 and 100 are disclosed, the lower ends of the shoe webs 68 and 70 have flat portions 102, 104 which engage relatively sharp cam surfaces formed on the edge of plate 98. Webs 68 and 70 are also provided with leg portions 106, 108 which extend under the retainer plate 100. Thus, anchor plate 98 serves as a reaction point for the braking force incurred by the shoes 64, 66 and retainer plate 100 serves to maintain the lateral position of the shoes 64, 66. A retaining spring 110 is secured to brackets pressed out of the plane of the shoe portions 72, 74 and serves to draw the lower ends of shoes 64, 66 together aginst the anchor plate 98.

The upper ends of the shoes 64, 66 are pulled toward each other by means of a spring 112. Spring 112 is formed of relatively soft wire having a low yield point. It has a zigzag configuration and enough spring tension to draw the shoes 64, 66 together against the opposed ends of the wheel cylinder 44 under normal brake shoe movement. However, if there is abnormal brake shoe movement due to lining wear, the spring 112 will be expanded beyond its yield point and will deform to a length greater than it was originally.

The brake 10 as described to this point functions in a normal fashion. When hydraulic fluid under pressure is applied through the fitting 58 to the bore 44 between the cups 52, 54, the pistons 46, 48 will be forced outwardly and, in turn, exert a force through the bearing members 90, 92 to the protruding portions 96, 98 of the shoes 64, 66. As the upper ends of the shoes are spread apart, they will pivot at their lower ends about the anchor plate 98 until they come in conact with the brake drum 24. Assuming a counterclockwise rotation of the brake drum 24 looking at the brake mechanism 10 as seen in FIGURE 1, brake shoe 64 will function as a primary self-energizing shoe with the braking reaction being taken through anchor plate 98. Shoe 66 will function as a de-energizing shoe because it is pivoting about an anchor point which leads the direction of motion. In other words shoe 66 is being forced by piston 48 against the direction of motion of the drum 24 whereas shoe 64 is being forced by piston 46 in the direction of motion and in the later case the forces tend to build up due to the frictional engagement with the drum 24 thereby resulting in a self-energizing action. Upon the deactivation of wheel cylinder 44, spring 112 will draw the shoes 64 and 66 away from contact with the drum 24.

An actuating mechanism is provided for the mechanical operation of the shoes 64, 66. The about to be described mechanical brake can serve either as an emergency brake in the event of failure of the hydraulic system or in the alternative as a parking brake to retain the vehicle when not in operation. The parking brake mechanism consists of a parking brake lever 114 which is a second-class lever having a fulcrum pin 116 pivotally securing the upper end of the lever 114 to the web 70 of shoe 66. The lower end of the lever 114 has a fitting 118 to which is attached an actuating cable 120. Cable 120 passes through a fitting 122 in the backing plate 32, so that the brake may be actuated from a point exterior of the brake assembly 10. A compressed spring 124 is provided coaxial about the cable 120 between fittings 118 and 122 and serves to urge the lever 114 in a counterclockwise deactivated position against the shoe portion 74 and further functions as an armor covering so that the cable 120 may assume a nonlinear configuration without fear of interference from other components of the braking system. That portion of cable 120 on the exterior of the backing plate 32 is provided with an appropriate protecting cover 126.

A notch 130 is provided near the upper end of the web 68 of shoe 64. A corresponding notch 128 is similarly formed in the brake lever 114 spaced near the pivot point 116. Interposed between the two notches 128 and 130 is a strut rod 132.

The foregoing constitutes the description of a reasonably conventional parking brake mechanism. When tension is applied to cable 120 by means of either a foot or hand lever at the operating position of the vehicle's passenger compartment, the lower end of parking lever 114 is drawn in a clockwise direction as it pivots about pin 160. This movement is also transmitted through the strut rod 132. Further movement of lever 114 will tend to force the strut rod 132 and shoe 64 to the left as lever 114 moves in a clockwise direction. At the same time the reaction through pin 116 will cause the upper end of shoe 66 to move to the right. It is now apparent that as the lever 114 is moved in clockwise rotation the upper ends of shoes 64 and 66 are forced to separate and, consequently, engage the brake drum 24 to effect a braking action. When tension is relieved from cable 120, spring 124 forces lever 114 to return to its normal counterclockwise position and retaining spring 112 retracts the shoes 64, 66 away from the brake drum 24.

Means are provided for automatically adjusting the spacing of the shoes 64, 66 relative to one another to compensate for brake lining wear. The just-mentioned automatic adjusting means include a cam member 134 which is pivotally secured to the lever 114 by means of a bolt 136. Member 134 is provided with a cam surface 138 which may engage the right hand end of rod 132. It is also provided at its upper end with a series of ratchet teeth 140. Engaging the ratchet teeth 140 is a pawl 142 which is pivoted on pin 116. An eccentric portion on pawl 142 is engaged by flat spring 144 that tends to direct the pawl 142 in a clockwise direction for engagement with the ratchet teeth 140.

A spring 146 is provided interposed between a flange 148 spot welded to the lever 114 and to a pin member 150 secured to the cam member 134. The thus described structure provides a spring 146 which is tending to urge the cam 134 to rotate in a clockwise direction. The pawl 142 prevents the cam member 134 from rotating in a counterclockwise direction.

The right-hand end of strut rod 132 engages the depth of notch 128. Because cam member 134 is urged by spring 146 to rotate in a clockwise direction, it will so move until cam surface 138 engages the right-hand end of the strut rod 132. The abutting of the strut rod 112 against the cam surface 138 will prevent further clockwise rotation of member 134.

In operation this mechanism provides for automatic adjusting of the separation of the brake shoes 64, 66. After the brakes have been in use for some time and the thickness of the linings 76, 78 have been reduced due to wear, the hydraulic wheel cylinder 40 will cause the shoes 64, 66 to be pressed against the drum 24 and because the linings 76, 78 are worn, the shoes 64, 66 will travel a greater distance and they will become abnormally separated due to the missing lining. This further separation of the shoes 64, 66 will cause the zigzag retracting spring 112 to be stretched beyond its designed limit. When the hydraulic pressure is relieved, the spring 112 will retract the shoes 64, 66 but because it was stretched beyond its yield point, it will not retract the shoes to their original position. This change will be reflected in an increase in dimension between the depth of slots 128 and 130. The strut 132 will then not seat tightly against the depth of the notch 128. Spring 146 which is urging the cam member 134 in a clockwise direction will force it to rotate with the cam surface 138 bearing against the right-hand end of rod 132. Thus, rod 132 will be moved in a left-hand direction for a distance corresponding to the yielding of spring 112. If the wearing of the lining had been great enough to sufficiently increase the dimension between the depths of notches 128 and 130, then cam member 134 will rotate until the pawl 142 passes over the end of one of the adjacent ratchet teeth 140.

The cam surface 138 is such that it is of increasing radius between its perimeter and pivot 136 at the point where it engages strut 132 when the cam 134 is rotated clockwise. After the cam 134 has rotated, the right-hand end of strut 132 will then be bearing against the cam surface 138 rather than the depth of the notch 128. Upon application of the parking brake 114 the forces from the lever 114 will be transmitted through the cam member 134 to the strut 132 rather than through the depth of the notch 128. In such subsequent brake applications, the pawl 142 serves as a reaction member resisting rotation of cam 134. As further wearing of the linings occur, slackness will again be created between the strut rod 132 and cam 134 due to the deformation of the retracting spring 112. When that slackness has been increased to a sufficient extent, cam member 134 will be rotated until the pawl member 142 passes over the next tooth of the ratchet teeth 140 and cam surface 138 engages the rod 132. It is now apparent that as the linings wear, an adjustment is automatically achieved to effect the separation of the brake shoes 64, 66. In a sense, cam member 134 rotates to form a new depth for the notch 128 and the spring and ratchet mechanism can cause the cam surface 138 to decrease the depth of the notch 128.

The portion of the automatic adjusting mechanism shown in FIGURE 7, discloses the relationship of the components after several adjustments have been made. The cam member 134 has rotated two notches from its original position and strut 132 strikes surface 138 rather than the full depth of notch 128. The shoes 64, 66 are thereby held closer to the drum 24 to compensate for the lining worn away.

The foregoing description constitutes the preferred embodiment of the present invention. However, this invention is adaptable to other configurations and embodiments which may occur to those familiar with the art. Such variations will come within the scope and spirit of the following claims.

I claim:

1. In an adjusting device for a pair of pivotably mounted members, a second class lever pivotably connected at one of its ends to one of said members, a strut interposed between the other of said members and said lever, said lever and strut being actuatable to force the separation of said members, adjusting means having an element rotatably mounted on said lever and having an edge of increasing radius engageable with the end of said strut, and spring means adapted to rotate said edge into engagement with said strut end.

2. In an adjusting device for a pair of pivotably mounted members, a second class lever pivotably connected at one of its ends to one of said members, a strut interposed between the other member and said lever, said lever and strut being actuatable to force a separation of said members, adjusting means having an element rotatably mounted on said lever and having an edge of increasing radius engageable with said strut end, spring means adapted to rotate said edge into engagement with one end of said strut, and pawl means mounted upon said lever adapted to prevent the counter rotation of said adjusting means.

3. In an adjusting device having a pair of pivotably mounted members, a second class lever pivotably connected at one of its ends to one of said members, a strut interposed between the other member and said lever, said lever and strut being actuatable to force the separation of said members, adjusting means having an element rotatably mounted on said lever, said element having an edge of increasing radius engageable with the end of said strut, spring means adapted to rotate said edge into engagement with one end of said strut, means adapted to prevent the counter rotation of said element, said last-mentioned means comprising a spring pressed pawl on said lever and a plurality of ratchet teeth on said element engageable by said pawl, a second spring means adapted to draw said members together, said second spring means being formed of a low yield point material.

References Cited in the file of this patent

UNITED STATES PATENTS

| | | |
|---|---|---|
| 1,900,791 | Brice | Mar. 7, 1933 |
| 2,034,922 | Presnell | Mar. 24, 1937 |
| 2,090,539 | Main | Aug. 17, 1937 |
| 2,196,396 | Lane | Apr. 9, 1940 |
| 2,322,061 | Schnell | June 15, 1943 |
| 2,345,107 | Goepfrich | Mar. 28, 1944 |
| 2,414,037 | Geyer | Jan. 7, 1947 |
| 2,421,802 | Mould | June 10, 1947 |
| 2,533,927 | Geyer | Dec. 12, 1950 |
| 2,583,970 | Schultz | Jan. 29, 1952 |
| 2,822,893 | Flueler | Feb. 11, 1958 |
| 2,861,657 | Curtis et al. | Nov. 25, 1958 |

FOREIGN PATENTS

| | | |
|---|---|---|
| 672,350 | France | Sept. 16, 1929 |
| 954,742 | France | June 13, 1949 |